US012719191B2

United States Patent

(12) United States Patent
Yamashima et al.

(10) Patent No.: US 12,719,191 B2
(45) Date of Patent: Aug. 25, 2026

(54) INTER-COMPONENT CONNECTION STRUCTURE

(71) Applicant: PANASONIC AUTOMOTIVE SYSTEMS CO., LTD., Kanagawa (JP)

(72) Inventors: Atsushi Yamashima, Kanagawa (JP); Daisuke Ohmori, Kanagawa (JP); Kei Takahashi, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 576 days.

(21) Appl. No.: 17/870,666

(22) Filed: Jul. 21, 2022

(65) Prior Publication Data

US 2023/0034324 A1 Feb. 2, 2023

(30) Foreign Application Priority Data

Jul. 29, 2021 (JP) ................................ 2021-124750

(51) Int. Cl.
*H01R 12/71* (2011.01)
*H01R 13/11* (2006.01)
(Continued)

(52) U.S. Cl.
CPC ......... *H01R 12/718* (2013.01); *H01R 13/113* (2013.01); *H01R 13/40* (2013.01); *H01R 13/04* (2013.01)

(58) Field of Classification Search
CPC .. H01R 12/7005; H01R 13/66; H01R 13/187; H01R 31/08; H01L 3/04; H01H 9/085
(Continued)

(56) References Cited

U.S. PATENT DOCUMENTS

| | | | | |
|---|---|---|---|---|
| 6,416,342 B2 * | 7/2002 | Matsumura | ............ | H01R 12/87 439/267 |
| 2011/0076901 A1 | 3/2011 | Glick et al. | | |

(Continued)

FOREIGN PATENT DOCUMENTS

| | | |
|---|---|---|
| CN | 107210559 A | 9/2017 |
| DE | 102021120174 A1 | 3/2022 |

(Continued)

OTHER PUBLICATIONS

Japanese Notice of Reasons For Refusal, dated Oct. 1, 2024, for Japanese Patent Application No. 2021-124750. (6 pages) (With English Machine Translation).

(Continued)

*Primary Examiner* — Tulsidas C Patel
*Assistant Examiner* — Thaslimur Rahman
(74) *Attorney, Agent, or Firm* — Seed Intellectual Property Law Group LLP

(57) ABSTRACT

An inter-component connection structure includes a male fitting member; and a female fitting member that has a first nipping portion and a second nipping portion disposed to face each other, and nips an insertion portion of the male fitting member inserted between the first nipping portion and the second nipping portion. A pair of the male fitting member and the female fitting member is disposed in different components. The first nipping portion and the second nipping portion are respectively bent to form protruding portions toward surfaces thereof facing each other. A gap is provided at a tip portion of each of the first nipping portion and the second nipping portion. In at least one of the pair of the male fitting member and the female fitting member, an insulating portion is provided in a region that is not in contact with the other when fitted.

11 Claims, 6 Drawing Sheets

(51) Int. Cl.
*H01R 13/40* (2006.01)
*H01R 13/04* (2006.01)

(58) Field of Classification Search
USPC .......................................................... 439/485
See application file for complete search history.

(56) References Cited

U.S. PATENT DOCUMENTS

| | | | | |
|---|---|---|---|---|
| 2011/0130028 | A1 | 6/2011 | Takehara et al. | |
| 2013/0090012 | A1* | 4/2013 | Natter .................... | H01R 43/16 29/874 |
| 2016/0028177 | A1* | 1/2016 | Nomura ................. | H01R 43/16 428/626 |
| 2017/0033486 | A1* | 2/2017 | Saka ...................... | H01R 13/03 |
| 2018/0019529 | A1 | 1/2018 | Morimoto et al. | |
| 2020/0076104 | A1 | 3/2020 | Motoshige | |
| 2022/0037819 | A1* | 2/2022 | Hosoda ................ | H01R 12/716 |
| 2022/0069501 | A1 | 3/2022 | Fujimura et al. | |

FOREIGN PATENT DOCUMENTS

| | | | | |
|---|---|---|---|---|
| JP | H0745329 | A | | 2/1995 |
| JP | H0850946 | A | | 2/1996 |
| JP | 3045111 | U | | 1/1998 |
| JP | 2006032113 | A | | 2/2006 |
| JP | 2006208555 | A | | 8/2006 |
| JP | 2011113946 | A | | 6/2011 |
| JP | 2012003913 | A | * | 1/2012 |
| JP | 2012-151226 | A | | 8/2012 |
| JP | 2018005981 | A | * | 1/2018 |
| JP | 2018206718 | A | | 12/2018 |
| JP | 2020129435 | A | | 8/2020 |

OTHER PUBLICATIONS

Office Action, dated Nov. 21, 2025, for Chinese Patent Application No. 202210896502.1. (17 pages).

Office Action, dated Feb. 19, 2026, for German Patent Application No. 10 2022 117 568.5. (11 pages)(with translation).

Office Action, dated Apr. 21, 2026, for Chinese Patent Application No. 202210896502.1. (17 pages)(with English Translation).

* cited by examiner

INTER-COMPONENT CONNECTION STRUCTURE

CROSS-REFERENCE TO RELATED APPLICATIONS

This application is based upon and claims the benefit of priority from Japanese Patent Application No. 2021-124750, filed on Jul. 29, 2021, the entire contents of which are incorporated herein by reference.

FIELD

The present disclosure relates to an inter-component connection structure, a power conversion device, and an inter-component connection method.

BACKGROUND

Conventionally, a power conversion device mounted on an electric vehicle or the like is provided with a plurality of circuit boards on which circuit configurations such as a DC/DC converter and an inverter are mounted. Such a power conversion device is required to be downsized, for example, from the viewpoint of mountability on a vehicle.

Under such circumstances, there is known a technique for downsizing a power conversion device while maintaining a mounting area on a plurality of circuit boards by stacking the plurality of circuit boards. In such a power conversion device, electrical connection between components may be performed by fitting a fitting portion such as a connector provided in a component such as each circuit board.

A conventional technique is disclosed in JP 2012-151226 A

However, in a case where the eye line is blocked by the circuit board at the time of assembly, such as a case where the board size is the same, there is a case where the fitting portion cannot be appropriately fitted due to difficulty in visual confirmation. Under such circumstances, in a case where the fitting members are in contact with each other in the assembled state, there is a problem that a misfitted product in which the fitting portion is not appropriately fitted cannot be detected in an electrical inspection, and an electrical connection failure between components cannot be suppressed. As a conventional technique, there is a measure such as attaching a resin component to each fitting portion, but there is a problem that it is necessary to attach a resin component to each fitting portion, which increases cost and increases working time.

The present disclosure provides an inter-component connection structure, a power conversion device, and an inter-component connection method capable of suppressing an electrical connection failure in a fitting portion that electrically connects components.

SUMMARY

An inter-component connection structure according to the present disclosure includes a male fitting member and a female fitting member. The male fitting member has an insertion portion. The female fitting member has a first nipping portion and a second nipping portion disposed to face each other, and nips the insertion portion of the male fitting member inserted between the first nipping portion and the second nipping portion. A pair of the male fitting member and the female fitting member is disposed in different components. The first nipping portion and the second nipping portion are respectively bent to form protruding portions toward surfaces thereof facing each other. A gap is provided at a tip portion of each of the first nipping portion and the second nipping portion. In at least one of the pair of the male fitting member and the female fitting member, an insulating portion is provided in a region that is not in contact with the other when fitted.

DETAILED DESCRIPTION

Figure 1:
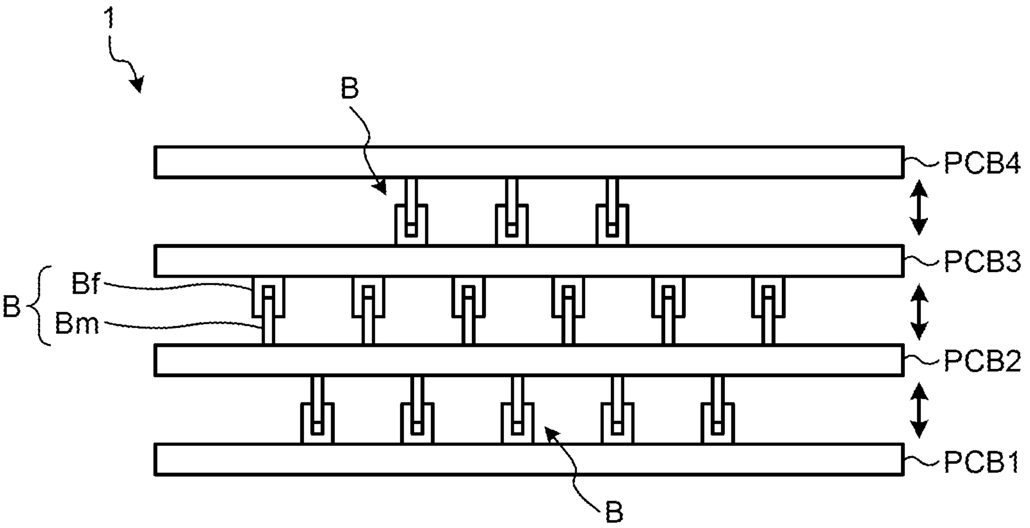
FIG. 1 is a schematic cross-sectional view illustrating an example of a layered structure of a plurality of printed circuit boards in a power conversion device according to an embodiment.

Hereinafter, embodiments of the inter-component connection structure, the power conversion device, and the inter-component connection method according to the present disclosure will be described with reference to the drawings.

In the description of the present disclosure, components having the same or substantially the same functions as those described previously with respect to the previously described drawings are denoted by the same reference numerals, and the description may be appropriately omitted. In addition, even in the case of representing the same or substantially the same portion, the dimensions and ratios may be represented differently from each other depending on the drawings. In addition, for example, from the viewpoint of ensuring visibility of the drawings, in the description of each drawing, only main components are denoted by reference numerals, and even components having the same or substantially the same functions as those described previously in the previous drawings may not be denoted by reference numerals.

Note that the inter-component connection structure according to the present disclosure is a structure for connecting any component to be connected, such as an electronic component, a circuit board, or a board unit. These components to be connected are components constituting a power conversion device such as a charger. As an example, the inter-component connection structure is a connection structure between circuit boards. As another example, the inter-component connection structure is a connection structure between an electronic component and a circuit board or a board unit. As another example, the inter-component connection structure is a connection structure between a circuit board and a board unit. As another example, the inter-component connection structure is a connection structure between electronic components. As another example, the inter-component connection structure is a connection structure between board units. Note that a cooling plate may be used as the component to be connected.

For example, the electronic component is a component such as a semiconductor element, a semiconductor module, a magnetic body, a capacitor, or a circuit breaker. The semiconductor module includes, for example, a plurality of semiconductor elements. Here, the magnetic body is a transformer, a transformer-integrated printed board, a reactor, or a choke. The circuit breaker is a relay or a fuse.

For example, the circuit board is a printed circuit board (PCB). The printed circuit board is, for example, a glass epoxy board formed using an aluminum alloy or a copper alloy as a base material. Note that the circuit board may be a circuit board included in a magnetic component such as a transformer, a reactor, or a choke. The magnetic component has, for example, a board on which a conductor pattern forms a winding, and has a function as a magnetic component by forming a closed magnetic path through a magnetic core inside and outside the winding formed on the board. In this case, the electronic component can be expressed as a printed board transformer or a transformer-integrated printed board.

For example, the board unit is a plurality of coupled circuit boards. In the board unit, the plurality of circuit boards may be coupled by the inter-component connection structure according to the present disclosure, or may be coupled by an adhesive, a screw, a bolt, or the like. In addition, the coupled circuit boards may be electrically connected or insulated. The board unit may be a circuit board on which an electronic component is mounted. In this case, the electronic component and the circuit board may be electrically connected, insulated, or only thermally connected.

In the following description, inter-component connection according to the present disclosure will be described using inter-board connection for electrically connecting a plurality of printed circuit boards as an example.

As an example, the power conversion device according to the embodiment is an in-vehicle charger that is mounted on an electric vehicle or the like, converts alternating-current power supplied from a power supply (external power supply) into direct-current power of a predetermined voltage, and outputs the direct-current power after the conversion to a battery such as a lithium-ion battery. Such a power conversion device includes a plurality of circuit boards on which circuit configurations such as a DC/DC converter and an inverter are mounted. Note that the inter-component connection structure according to the present disclosure may be applied to connection between the DC/DC converter module or the inverter module and the circuit board.

FIG. 1 is a schematic cross-sectional view illustrating an example of a layered structure of a plurality of printed circuit boards in a power conversion device 1 according to an embodiment. FIG. 1 illustrates a first circuit board PCB1, a second circuit board PCB2, a third circuit board PCB3, and a fourth circuit board PCB4 among a plurality of circuit boards included in the power conversion device 1.

The first circuit board PCB1, the second circuit board PCB2, the third circuit board PCB3, and the fourth circuit board PCB4 each are printed circuit boards. In the following description, a plurality of one pair of fitting members B may be referred to as a plurality of pairs of fitting members B. In addition, the pair of fitting members B may be referred to as fitting portions.

The first circuit board PCB1 is coupled to the second circuit board PCB2 by the plurality of pairs of fitting members B. The second circuit board PCB2 is coupled to each of the first circuit board PCB1 and the third circuit board PCB3 by the plurality of pairs of fitting members B. The third circuit board PCB3 is coupled to the second circuit board PCB2 and the fourth circuit board PCB4 by the plurality of pairs of fitting members B. The fourth circuit board PCB4 is coupled to the third circuit board PCB3 by the plurality of pairs of fitting members B. Accordingly, the respective boards are electrically connected via the respective plurality of pairs of fitting members B.

Note that only a part of the plurality of circuit boards included in the power conversion device 1 can be a printed circuit board. For example, at least one of the first circuit board PCB1, the second circuit board PCB2, the third circuit board PCB3, and the fourth circuit board PCB4 may be a printed circuit board. In addition, the connection between the circuit boards by the pair of fitting members B is not necessarily an electrical connection. However, the embodiment mainly exemplifies a case where two circuit boards are electrically coupled by the plurality of pairs of fitting members B.

As described above, in the power conversion device 1 according to the embodiment, two adjacent circuit boards of at least two circuit boards stacked are coupled by the plurality of pairs of fitting members B. Each of the plurality of pairs of fitting members B includes a male fitting member Bm and a female fitting member Bf. That is, the plurality of pairs of fitting members B is a plurality of one pair of fitting members B. In addition, each of the plurality of pairs of fitting members B, that is, the pair of fitting members B is a set of the male fitting member Bm and the female fitting member Bf. Here, one of the plurality of pairs of fitting members B is disposed on each of the main surfaces of the two stacked circuit boards facing each other.

Specifically, as illustrated in FIG. 1, in each of the plurality of pairs of fitting members B, the male fitting member Bm is disposed on one of the two circuit boards to be stacked, and the female fitting member Bf is disposed on the other of the two circuit boards to be stacked.

Which one of the male fitting member Bm and the female fitting member Bf is disposed on each of the plurality of circuit boards can be arbitrarily determined. As an example, as illustrated in FIG. 1, only one of the male fitting member Bm and the female fitting member Bf is disposed on each of two circuit boards coupled by fitting of the plurality of pairs of fitting members B. As another example, at least one male fitting member Bm and at least one female fitting member Bf are disposed on each of two circuit boards coupled by fitting of the plurality of pairs of fitting members B. In this case, in each circuit board, the male fitting member Bm can be disposed on one main surface, and the female fitting member Bf can be disposed on the other main surface. Alternatively, in each circuit board, both the male fitting member Bm and the female fitting member Bf can be disposed on one main surface.

In addition, in each circuit board, two or more circuit boards may be coupled to one main surface.

The male fitting member Bm is a blade-shaped connector (plug) to be inserted. The male fitting member Bm can also be expressed as a flat plug blade. The female fitting member Bf is a connector (receptacle) that receives insertion. The female fitting member Bf can also be expressed as a blade receiving spring.

Figure 2:
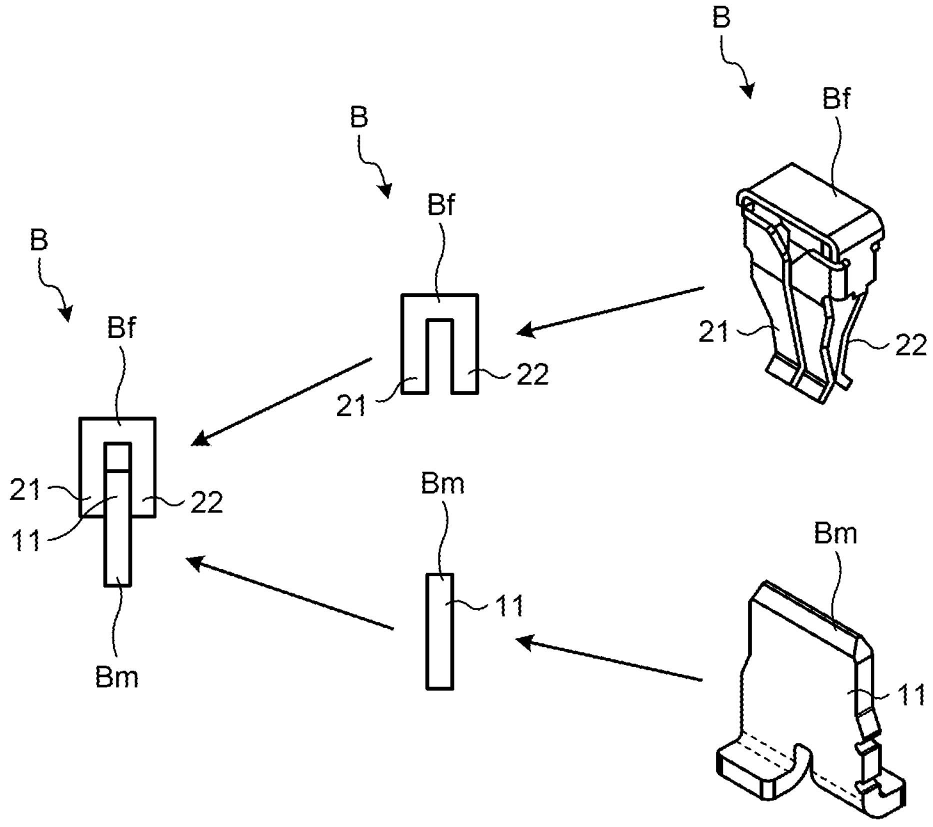
FIG. 2 is a schematic view illustrating an example of a configuration of a pair of fitting members in FIG. 1.
Figure 3:
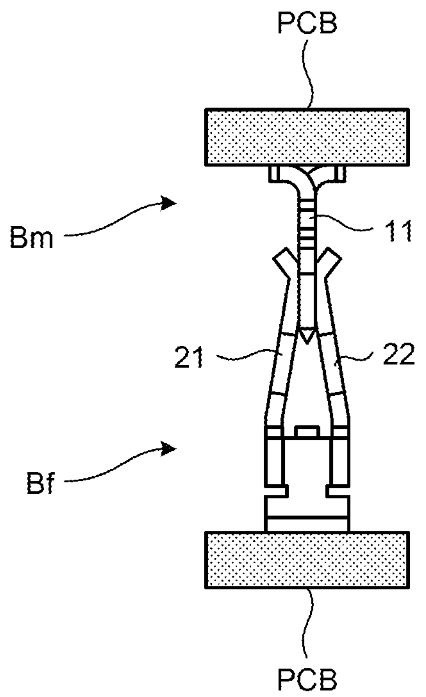
FIG. 3 is a schematic cross-sectional view illustrating an example of a fitting state of the pair of fitting members in FIG. 1.

FIG. 2 is a schematic view illustrating an example of a configuration of the pair of fitting members B in FIG. 1. FIG. 3 is a schematic cross-sectional view illustrating an example of a fitting state of the pair of fitting members B in FIG. 1. (a) of FIG. 2 and FIG. 3 illustrate an example of a fitting state of the pair of fitting members B. (b) of FIG. 2 simply illustrates each of the male fitting member Bm and the female fitting member Bf similarly to FIG. 1. (c) of FIG. 2 and FIG. 3 specifically illustrate each of the male fitting member Bm and the female fitting member Bf.

An insertion portion 11 of the male fitting member Bm mounted on the circuit board PCB is inserted into a receiving portion 20 of the female fitting member Bf. Specifically, the insertion portion 11 is inserted to expand the interval between a first nipping portion 21 and a second nipping portion 22 while coming into contact with the first nipping portion 21 and the second nipping portion 22. As illustrated in (a) of FIG. 2 and FIG. 3, the female fitting member Bf nips the insertion portion 11 of the male fitting member Bm inserted between the first nipping portion 21 and the second nipping portion 22, such that the circuit board PCB on which the female fitting member Bf is disposed and the circuit board PCB on which the male fitting member Bm is disposed are coupled. Note that the length of inserting the male fitting member Bm into the female fitting member Bf, that is, the insertion height can be appropriately set according to the distance between the boards to be coupled, or the like.

Figure 4:
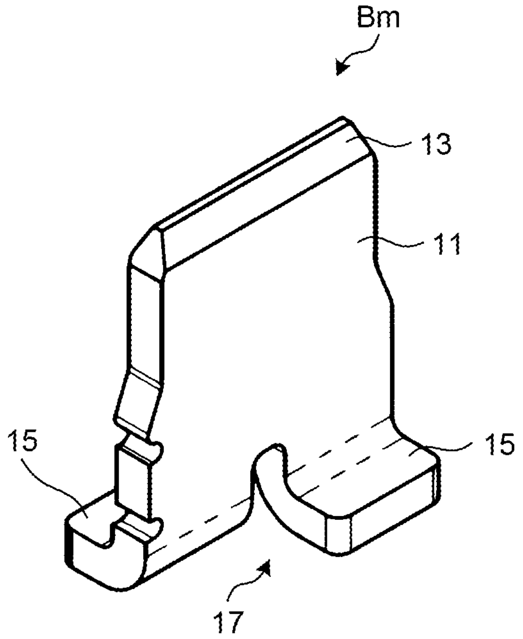
FIG. 4 is a schematic perspective view illustrating an example of a configuration of a male fitting member in FIG. 1.

FIG. 4 is a schematic perspective view illustrating an example of a configuration of the male fitting member Bm in FIG. 1. The insertion portion 11 of the male fitting member Bm has a substantially flat plate shape. A tip portion 13 of the insertion portion 11 is chamfered and has a smaller thickness toward the tip. Accordingly, the insertion portion 11 can be easily inserted into the receiving portion 20 of the female fitting member Bf. A connection portion 15 of the insertion portion 11 is each of the rear ends of the insertion portion 11 divided into three by a gap 17. The connection portion 15, that is, each of the divided rear ends of the insertion portion 11 is bent in a direction substantially perpendicular to the insertion portion 11. The connection portion 15 is soldered to a predetermined position on the PCB board, and electrically connects the insertion portion 11 with the wiring on the PCB board. The insertion portion 11 and the connection portion 15 can be formed by, for example, bending a single metal plate.

Note that the number of divisions of the rear end of the insertion portion 11 of the male fitting member Bm can be arbitrarily designed to be two or more. As an example, the larger the length of the insertion portion 11, the larger the number of divisions is.

Figure 5:
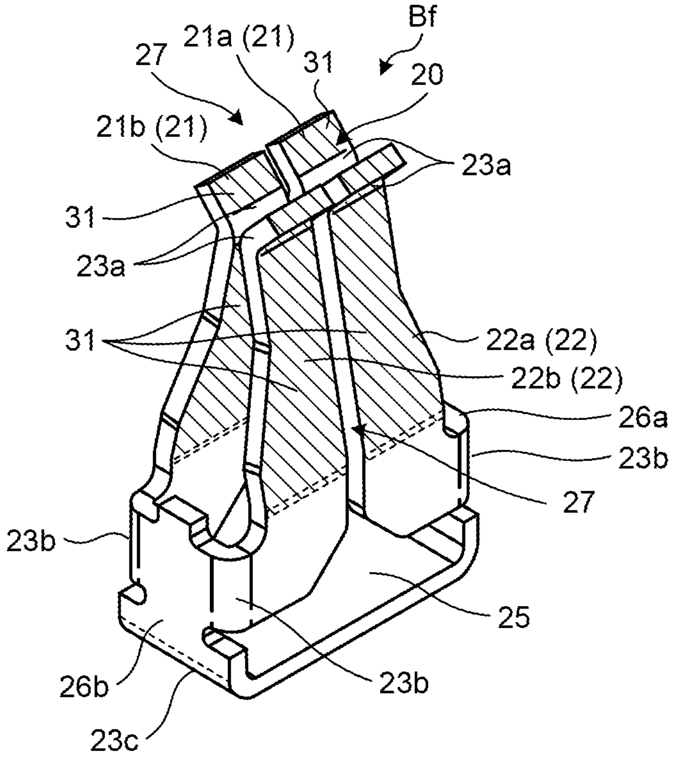
FIG. 5 is a schematic perspective view illustrating an example of a configuration of a female fitting member in FIG. 1.

FIG. 5 is a schematic perspective view illustrating an example of a configuration of the female fitting member Bf in FIG. 1. The female fitting member Bf nips the insertion portion 11 of the male fitting member Bm inserted into the receiving portion 20. The female fitting member Bf is formed by, for example, bending a single metal plate. The female fitting member Bf has a substantially Y-shape or X-shape opening toward the tip when viewed from the side surface side, that is, a first base portion 26*a* side or a second base portion 26*b* side.

Specifically, the female fitting member Bf includes the first nipping portion 21 and the second nipping portion 22. The first nipping portion 21 and the second nipping portion 22 are disposed to face each other. The surface of the first nipping portion 21 facing the second nipping portion 22 and the surface of the second nipping portion 22 facing the first nipping portion 21 form the receiving portion 20. That is, the first nipping portion 21 and the second nipping portion 22 face each other with the receiving portion 20 interposed there between. The female fitting member Bf nips the insertion portion 11 of the male fitting member Bm inserted into the receiving portion 20 between the first nipping portion 21 and the second nipping portion 22. The first nipping portion 21 is bent at a first bent portion 23*a* into a protruding shape toward the facing second nipping portion 22. Similarly, the second nipping portion 22 is bent at the first bent portion 23*a* into a protruding shape toward the facing first nipping portion 21. In other words, the first nipping portion 21 and the second nipping portion 22 are respectively bent at the first bent portion 23*a* to form protruding portions toward the surfaces thereof facing each other. The first bent portion 23*a* of the first nipping portion 21 and the first bent portion 23*a* of the second nipping portion 22 are separated from each other via the receiving portion 20. The distance between the first bent portion 23*a* of the first nipping portion 21 and the first bent portion 23*a* of the second nipping portion 22 is smaller than the thickness of the insertion portion 11 of the male fitting member Bm.

Each of the first nipping portion 21 and the second nipping portion 22 is provided with a gap 27 from the tip to the rear end. That is, each of the first nipping portion 21 and the second nipping portion 22 is divided into two by the gap 27. In other words, the tip portion of the female fitting member Bf is divided into four by the gap 27. Specifically, the first nipping portion 21 includes a first elastic portion 21*a* and a second elastic portion 21*b* divided by the gap 27. Similarly, the second nipping portion 22 includes a third elastic portion 22*a* and a fourth elastic portion 22*b* divided by the gap 27. Here, it can also be expressed that the first elastic portion 21*a* and the second elastic portion 21*b* are separated via the gap 27. Similarly, it can also be expressed that the third elastic portion 22*a* and the fourth elastic portion 22*b* are separated via the gap 27.

Although FIG. 5 illustrates the female fitting member Bf divided into four by the gap 27, the present invention is not limited to this. The number of divisions by the gap 27 may be five or more. However, it is preferable that the number of divisions of the first nipping portion 21 is equal to the number of divisions of the second nipping portion 22, and the number of divisions by the gap 27 is, for example, an even number of six or more. A relative rotational position shift between the pair of fitting members B described later may occur in any direction. Therefore, by making the number of divisions of the first nipping portion 21 equal to the number of divisions of the second nipping portion 22, it is possible to expand the geometric allowable range of the fitting portion regardless of the direction of the rotational position shift.

Each of the first elastic portion 21*a* and the third elastic portion 22*a* extends from the first base portion 26*a*. In other words, each of the first elastic portion 21*a* and the third elastic portion 22*a* is continuously and integrally connected to the first base portion 26*a* via a second bent portion 23*b*. In addition, each of the second elastic portion 21*b* and the fourth elastic portion 22*b* extends from the second base portion 26*b*. In other words, each of the second elastic portion 21*b* and the fourth elastic portion 22*b* is continuously and integrally connected to the second base portion 26*b* via the second bent portion 23*b*. In addition, each of the first base portion 26*a* and the second base portion 26*b* extends from a connection portion 25 to the printed circuit board. In other words, each of the first base portion 26*a* and the second base portion 26*b* is continuously and integrally connected to the connection portion 25 via a third bent portion 23*c*.

Therefore, each of the first elastic portion 21*a*, the second elastic portion 21*b*, the third elastic portion 22*a*, and the fourth elastic portion 22*b* corresponds to a shape obtained by dividing the first nipping portion 21 and the second nipping portion 22, and can be deformed independently according to the contact state with the insertion portion 11.

The insertion portion 11 of the male fitting member Bm according to the embodiment has a substantially flat plate shape. In addition, the female fitting member Bf according to the embodiment is configured to be fitted with the male fitting member Bm by nipping the inserted insertion portion 11 having a substantially flat plate shape. Accordingly, the inter-board connection structure according to the embodiment can increase the contact area between the pair of fitting members B as compared with, for example, an inter-board connection structure to be realized using a male fitting member having a pin-shaped insertion portion, and thus can reduce the contact resistance. Reduction of the contact resistance between the pair of fitting members B contributes to suppression of heat generation and power loss in the pair of fitting members B, improvement of the degree of freedom regarding the shape and material of the female fitting member Bf, simplification of determination of the connection state, or the like.

For example, when the diameter of the pin shape and the thickness of the flat plate shape are the same, since the width of the flat plate shape can be arbitrarily set, the contact area of the flat plate-shaped male fitting member Bm with the female fitting member Bf can be made larger than that of the pin-shaped male fitting member having the same length. In addition, for example, when the cross-sectional areas of the pin shape and the flat plate shape in the cross section parallel to the board are the same, the area of the main surface of the flat plate shape can be made larger than the surface area of the pin shape having the same length by appropriately setting the thickness and width of the flat plate shape. That is, the flat plate-shaped male fitting member Bm can have a larger contact area with the female fitting member Bf than the pin-shaped male fitting member having the same length.

Here, the thickness of the insertion portion 11 is the size in the horizontal direction of the insertion portion 11 in the state illustrated in FIG. 1. In addition, the length of the insertion portion 11 is the size in the vertical direction of the insertion portion 11 in the state illustrated in FIG. 1. In addition, the width of the insertion portion 11 is the size in the direction perpendicular to the insertion portion 11 in the state illustrated in FIG. 1.

In the present disclosure, the male fitting member Bm having the insertion portion 11 having a substantially flat plate shape is exemplified, but the present disclosure is not limited to this. For example, the male fitting member Bm may have an insertion portion 11 having a substantially cylindrical shape such as a pin shape. Even in this case, the plurality of elastic portions of the female fitting member Bf according to the embodiment can be deformed independently according to the contact state with the insertion portion 11 having a substantially cylindrical shape. Note that the plurality of elastic portions of the female fitting member Bf may be disposed, for example, in an annular shape to be fitted with the male fitting member Bm by nipping the inserted insertion portion 11 having a substantially cylindrical shape.

The male fitting member Bm and the female fitting member Bf are each formed of a metal material. As an example, the male fitting member Bm and the female fitting member Bf are formed of copper, a copper alloy including brass, aluminum, or an aluminum alloy.

In addition, conductor plating is applied to a part or all of the surface regions of the male fitting member Bm and the female fitting member Bf. For example, the conductor plating is applied on a region that comes into contact with each other when the male fitting member Bm and the female fitting member Bf are normally fitted. As the conductor plating, for example, tin plating, silver plating, or gold plating can be appropriately used.

Here, tin has a property of being easily alloyed with nickel used for the base of the male fitting member Bm and the female fitting member Bf. When the ambient temperature increases, alloying of tin and nickel proceeds, and the resistance value becomes 1 [mΩ] or more. On the other hand, the alloying of silver and gold with nickel hardly proceeds, but the use of silver and gold increases the cost. When the contact resistance between the male fitting member Bm and the female fitting member Bf is large, a temperature rise occurs at a contact portion between the male fitting member Bm and the female fitting member Bf. Therefore, in the power conversion device 1 according to the embodiment, the contact resistance at the contact portion between the male fitting member Bm and the female fitting member Bf is set to 1 [mΩ] or less. In other words, the contact resistance between the insertion portion 11 of the male fitting member Bm and the protruding portion of the first nipping portion 21 or the second nipping portion 22 in the state where the pair of fitting members B is fitted is 1 [mΩ] or less.

The magnitude of the contact resistance is defined by "contact pressure", "material (such as tin on the surface)", and "contact area". Therefore, in the power conversion device 1 according to the embodiment, as an example, the contact resistance is adjusted to 1 [mΩ] or less by adjusting the elastic forces of the four elastic portions of the female fitting member Bf. In other words, in the female fitting member Bf according to the embodiment, the elastic forces of the four elastic portions are designed such that the contact resistance is 1 [mΩ] or less. Note that the elastic forces of the four elastic portions depend on, for example, the material (base material) of the female fitting member Bf and its shape.

In addition, the female fitting member Bf according to the present embodiment is provided with an insulating portion 31. The insulating portion 31 is provided in a region of the female fitting member Bf that is not in contact with each other when the male fitting member Bm and the female fitting member Bf are normally fitted. Alternatively, the insulating portion 31 is provided in a region where conductor plating is not applied.

As an example, as illustrated in FIG. 5, the insulating portion 31 is provided on the surfaces of the first nipping portion 21 and the second nipping portion 22 of the female fitting member Bf facing each other and the surfaces opposite thereto. On the other hand, the insulating portion 31 is not provided in a region of the first bent portion 23*a* bulging in a protruding shape, that is, a region in contact with the male fitting member Bm in the fitted state.

As an example, the insulating portion 31 is formed by surface treatment of the female fitting member Bf. For example, the insulating portion 31 is an insulator layer (coated layer) formed on the surface of the female fitting member Bf. The surface treatment may be application or coating with an insulator on the surface of the female fitting member Bf. As an example, the insulator is a resin. Preferably, the insulator is a heat dissipation insulation type resin. The heat dissipation insulation type resin is, for example, a black resin having high heat dissipation, that is, easily radiating radiant heat. Alternatively, the surface treatment may be a heat dissipation insulation type plating treatment on the surface of the female fitting member Bf, such as an alumite treatment. In this case, the insulator is plating formed on the surface of the female fitting member Bf. In addition, as the surface treatment, an insulating film formed of an insulator may be attached to the surface of the female fitting member Bf. The heat dissipation of the insulator may be given by the surface property of the layer of the insulator or the insulating film.

The surface treatment performed on the insulating portion 31 is preferably a surface treatment for reducing frictional resistance between the pair of fitting members B. As an example, the insulating portion 31 is formed by glossy coating. Here, glossy coating is coating that has a smooth coating surface and reduces frictional resistance of the coating surface. In addition, the surface treatment performed on the insulating portion 31 is preferably a surface treatment for increasing wear resistance between the pair of fitting members B. Here, the surface treatment for increasing the wear resistance is assumed to be a surface treatment for reducing wear when the male fitting member Bm and the female fitting member Bf are rubbed and suppressing occurrence of metal contamination. The surface treatment for reducing the frictional resistance between the pair of fitting members B may be realized by a common surface treatment such as glossy coating, and the surface treatment for increasing the wear resistance.

Note that the female fitting member Bf may be formed of an insulator, the insulating portion 31 may be provided on the entire female fitting member Bf formed of a conductor, and conductor plating (conductive portion) may be applied only on a region in contact with the male fitting member Bm in the fitted state. That is, the insulating portion 31 may be provided in a region where conductor plating is not applied. Alternatively, an insulator may be provided on the entire female fitting member Bf formed of a conductor, and surface treatment for removing the insulator only in a region in contact with the male fitting member Bm in the fitted state may be applied. Alternatively, the female fitting member Bf may be formed of a conductor, conductor plating may be provided on the entire female fitting member Bf formed of an insulator, and the insulating portion 31 may be applied only on a region that is not in contact with the male fitting member Bm in the fitted state. Alternatively, a conductor may be provided on the entire female fitting member Bf formed of an insulator, and surface treatment for removing the conductor in a region not in contact with the male fitting member Bm in the fitted state may be performed. In this manner, the insulating portion 31 may not be formed as a layer of an insulator. In addition, the insulating portion 31 may be formed as another portion of the formed conductive portion by surface treatment for forming the conductive portion.

Accordingly, in the flow of the inter-component connection according to the embodiment described below, the inter-component connection state can be determined. Specifically, when a defect occurs in the fitting of the pair of male fitting members Bm and female fitting members Bf due to the positional deviation between the insertion portion 11 and the receiving portion 20, the connection failure can be detected by electrical inspection. Here, the electrical inspection is measurement of a resistance value through a contact portion between the male fitting member Bm and the female fitting member Bf.

Figure 6:
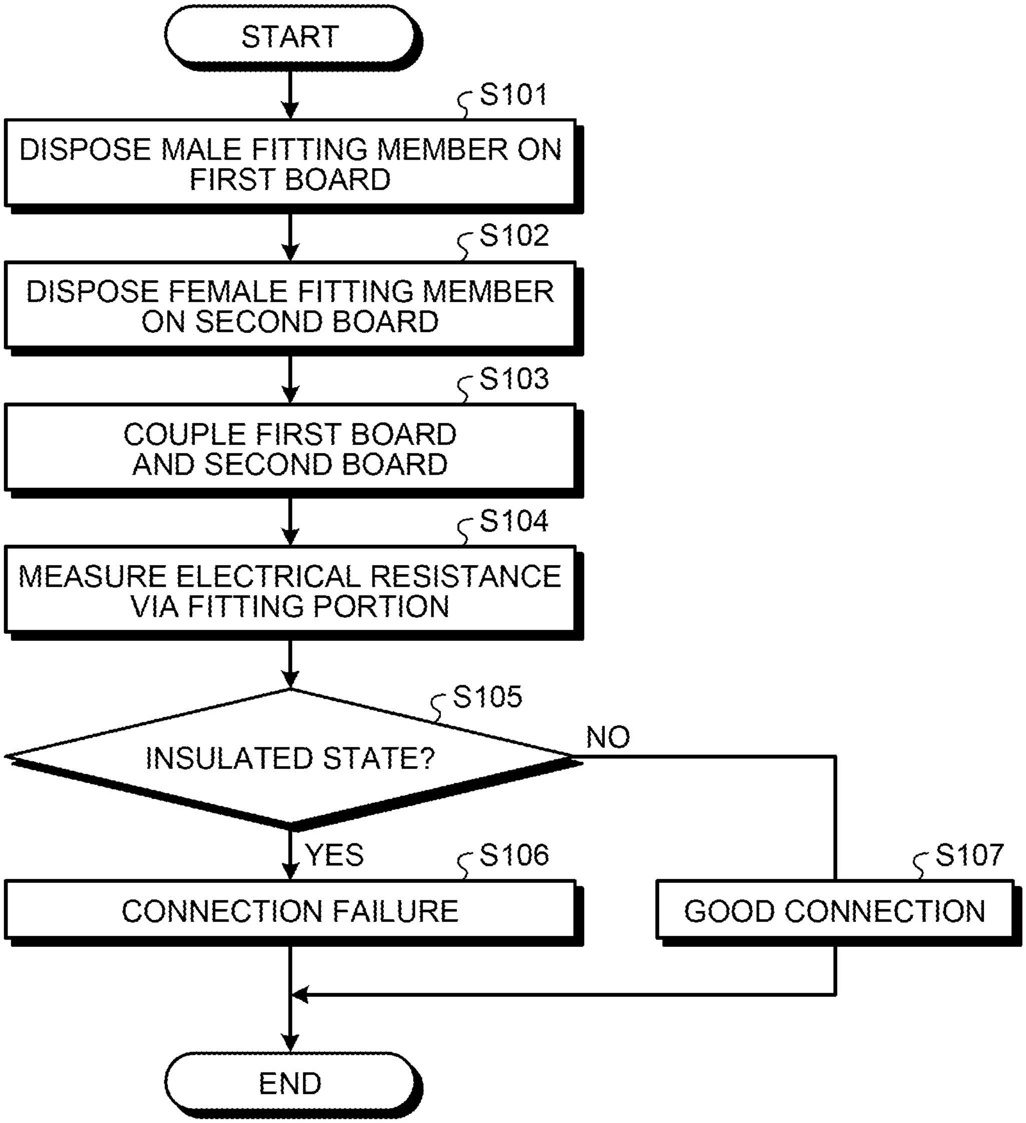
FIG. 6 is a flowchart illustrating an example of a flow of inter-component connection according to the embodiment.

Hereinafter, an example of a flow of inter-component connection according to an embodiment will be described with reference to the drawings. FIG. 6 is a flowchart illustrating an example of a flow of inter-component connection according to the embodiment. Here, a case where the first circuit board PCB1 provided with the male fitting member Bm and the second circuit board PCB2 provided with the female fitting member Bf are coupled will be described as an example.

First, the male fitting member Bm is disposed on the main surface of the first board PCB1 on the second board PCB2 side (S101). In addition, the female fitting member Bf is disposed on the main surface of the second board PCB2 on the first board PCB1 side (S102). After each of the pair of fitting members B is disposed on the printed circuit board, for example, an automated optical inspection (AOI) is used to inspect a mounting state of each of the pair of fitting members B on the printed circuit board. When a defect is detected in the mounting state of each of the pair of fitting members B on the printed circuit board by this inspection, the subsequent flow is not performed for the printed circuit board in which the defect is detected.

After that, the first board PCB1 and the second board PCB2 are coupled by fitting of the pair of fitting members B (S103). In this step, after the contact between the male fitting member Bm and the female fitting member Bf is detected by the sensor, one printed circuit board is pushed into the other printed board to form a fixed state of the layered structure. The female fitting member Bf has an elastic force (spring force) opposite the insertion direction of the insertion portion 11 of the male fitting member Bm. Therefore, when the plurality of male fitting members Bm are simultaneously pushed into the plurality of female fitting members Bf, some of the male fitting members Bm may be detached from the receiving portion 20 of the female fitting member Bf. Therefore, in this step, after a secure fitting state is once created, one printed circuit board is further pushed into the other printed board, realizing good fitting. Here, the secure fitting state refers to, for example, a steady state in which the insertion portion 11 is pushed into the receiving portion 20 by about 1 mm.

After that, the electrical resistance is measured via the fitting portion (S104). The measurement of the electrical resistance via the fitting portion is, for example, a measurement of the electrical resistance between any position of the circuit configuration on the first board PCB1 electrically connected to the male fitting member Bm and any position of the circuit configuration on the second board PCB2 electrically connected to the female fitting member Bf.

When the electrical resistance through the fitting portion indicates the insulated state (S105: Yes), it is determined that the fitting portion has a connection failure (S106). For example, when the male fitting member Bm is in contact with the female fitting member Bf via the insulating portion 31, the electrical resistance via the fitting portion indicates an insulated state.

On the other hand, when the electrical resistance through the fitting portion does not indicate the insulated state (S105: No), it is determined that the fitting portion is well connected (S107). For example, when the male fitting member Bm is in contact with the female fitting member Bf in the region of the first bent portion 23*a* bulging in a protruding shape, the electrical resistance via the fitting portion does not indicate an insulated state. After S106 or S107, the flow of FIG. 6 ends.

As described above, according to the inter-board connection method realized by using the pair of fitting members B according to the embodiment, it is possible to suppress electrical connection failure in the fitting portion that electrically connects the components.

As described above, the male fitting member Bm and the female fitting member Bf that are each mounted are fitted to each other, and thus the two circuit boards are coupled. However, in a case where the eye line is blocked by the circuit board at the time of assembly, such as a case where the board size is the same, there is a case where the fitting portion cannot be appropriately fitted due to difficulty in visual confirmation. Under such circumstances, in a case where the fitting members are in contact with each other in the assembled state, there is a problem that a misfitted product in which the fitting portion is not appropriately fitted cannot be detected in an electrical inspection, and an electrical connection failure between components cannot be suppressed. As a conventional technique, there is a measure such as attaching a resin component to each fitting portion, but there is a problem that it is necessary to attach a resin component to each fitting portion, which increases cost and increases working time.

Under such circumstances, in the inter-component connection structure according to the embodiment, the insulating portion 31 is provided in a region of the female fitting member Bf that is not in contact with the male fitting member Bm when fitted. Therefore, insulation can be performed in the fitting member B at the time of misfitting, and the misfitted product can be detected by electrical inspection, such that it is possible to suppress electrical connection failure in the fitting portion that electrically connects the components.

In addition, in the inter-component connection structure according to the embodiment, since the insulating portion 31 provided in the female fitting member Bf has high heat dissipation in addition to insulating properties, heat dissipation from the fitting member B can be improved. Accordingly, even when a large current flows through the fitting member B, it is possible to prevent the fitting member B from generating heat and increasing in temperature.

In addition, in the inter-component connection structure according to the embodiment, the receiving portion 20 of the female fitting member Bf into which the insertion portion 11 is inserted has a shape in which the first nipping portion 21 and the second nipping portion 22 are more separated toward the tip, and is provided with the insulating portion 31 formed by glossy coating. Accordingly, the insertion portion 11 of the male fitting member Bm inserted into the receiving portion 20 can be slid and guided between the first nipping portion 21 and the second nipping portion 22. Therefore, it is possible to prevent the male fitting member Bm from not being inserted between the first nipping portion 21 and the second nipping portion 22 and crushing the female fitting member Bf at the time of fitting. In addition, since the insulating portion 31 is provided from the receiving portion 20 to the vicinity of the region (contact point) in contact with the male fitting member Bm at the time of fitting, it is also possible to suppress metal contamination generated by rubbing of the male fitting member Bm with the female fitting member Bf at the time of insertion.

Note that it is also possible to realize a configuration in which the surfaces of the first nipping portion 21 and the second nipping portion 22 facing each other, that is, the surfaces that may be in contact with the male fitting member Bm to be inserted, are subjected to glossy coating, and the outer peripheral surfaces opposite thereto are subjected to non-glossy coating to enhance heat dissipation.

Hereinafter, modifications of the inter-component connection structure, the power conversion device, and the inter-component connection method according to the embodiments will be described with reference to the drawings. In the following description, differences from the above-described embodiment or each modification will be mainly described, and redundant description will be appropriately omitted.

First Modification

Figure 7:
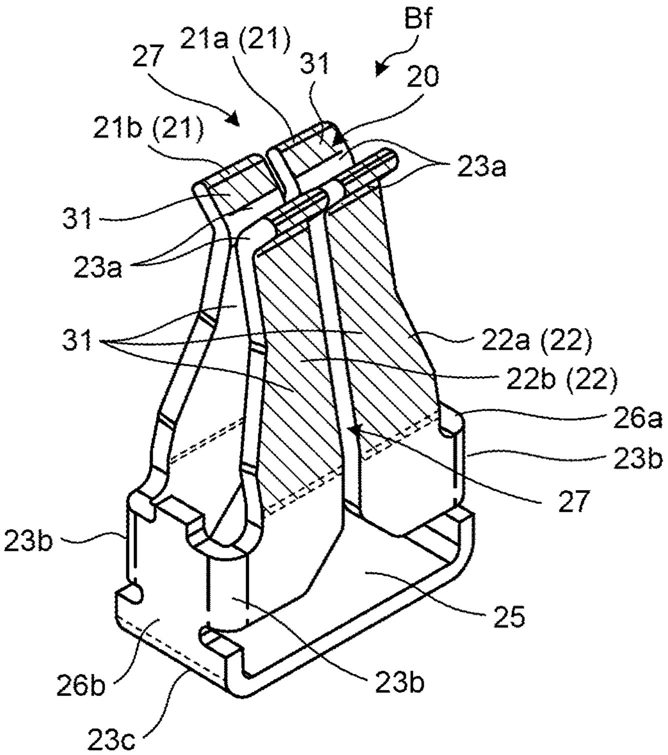
FIG. 7 is a schematic perspective view illustrating another example of the configuration of the female fitting member in FIG. 1.

FIG. 7 is a schematic perspective view illustrating another example of a configuration of the female fitting member Bf in FIG. 1. As illustrated in FIG. 7, the edge of the tip portion of the female fitting member Bf is preferably removed. The edge removal can be performed, for example, by hitting and rounding the edge of the receiving portion 20 of the female fitting member Bf or scraping the edge.

As described above, in the inter-component connection structure according to the present modification, the receiving portion 20 of the female fitting member Bf, that is, the end surface at the tip into which the insertion portion 11 of the male fitting member Bm is inserted is subjected to the edge removal treatment as the end surface treatment for removing the edge of the end surface. In other words, the edge of the end surface at the tip of the female fitting member Bf that may come into contact with the insertion portion 11 of the male fitting member Bm when misfitting occurs or the like is removed by the end surface treatment. Therefore, it is possible to suppress occurrence of metal contamination due to scraping of the male fitting member Bm by the edge of the tip portion of the female fitting member Bf. In addition, in a case where the male fitting member Bm is coated, it is possible to suppress scraping of the coating of the male fitting member Bm.

Second Modification

Figure 8:
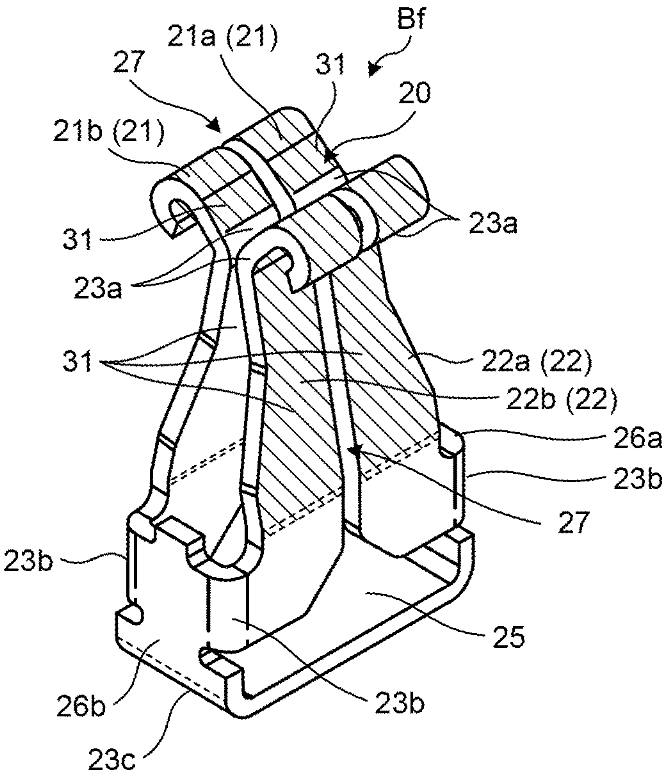
FIG. 8 is a schematic perspective view illustrating another example of the configuration of the female fitting member in FIG. 1.

FIG. 8 is a schematic perspective view illustrating another example of a configuration of the female fitting member Bf in FIG. 1. As illustrated in FIG. 8, the end surface treatment of the tip portion of the female fitting member Bf can also be realized by curling processing of the tip portion. For example, as illustrated in FIG. 8, each of the first nipping portion 21 and the second nipping portion 22 is subjected to curling processing as end surface treatment in which the first nipping portion 21 and the second nipping portion 22 are bent outward to cause surfaces facing each other to face opposite directions at the tip into which the insertion portion 11 is inserted. In other words, the edge of the end surface at the tip of the female fitting member Bf is not exposed to the outside of the female fitting member Bf with which the insertion portion 11 of the male fitting member Bm can come into contact when misfitting occurs or the like. Even with this configuration, the same effects as those of the first modification can be obtained. In addition, according to the curling processing of the tip portion of the female fitting member Bf, since the receiving portion 20 can be formed such that the first nipping portion 21 and the second nipping portion 22 are away from each other toward the tip, it is possible to reduce wear caused by the guiding of the insertion portion 11 by the receiving portion 20 and to make it easy for the surface treatment to ride on the contact portion with the male fitting member Bm to be inserted.

Note that each modification described above is applicable not only to the receiving portion 20 but also to other edges that may come into contact with the male fitting member Bm at the time of fitting. In addition, each modification described above is applicable not only to the female fitting member Bf but also to an edge that may come into contact with the female fitting member Bf at the time of fitting among the male fitting members Bm such as the tip portion 13.

Third Modification

Figure 9:
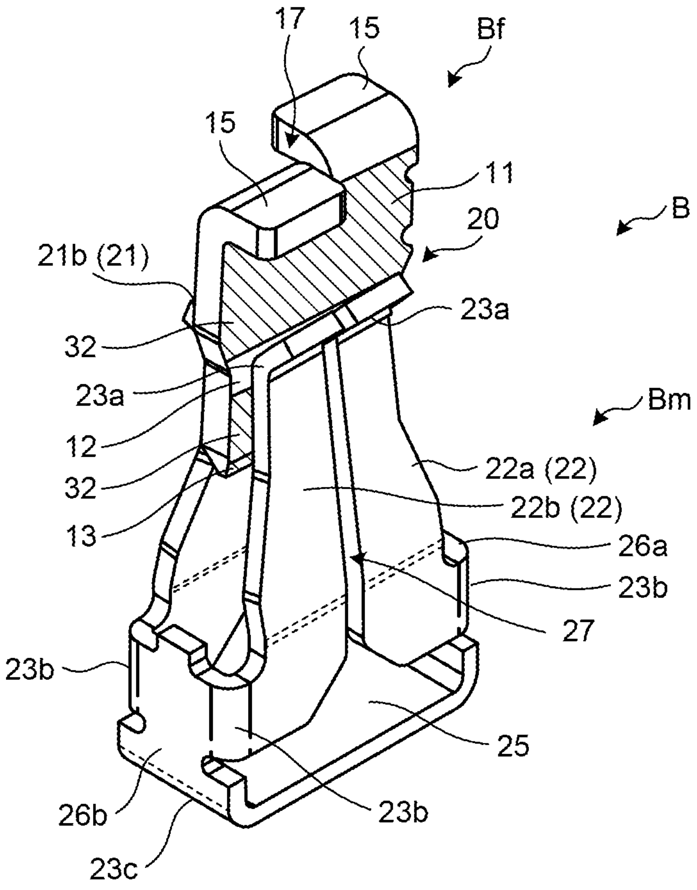
FIG. 9 is a schematic perspective view illustrating another example of the configuration of the male fitting member in FIG. 1.

FIG. 9 is a schematic perspective view illustrating another example of a configuration of the male fitting member Bm in FIG. 1. FIG. 9 also illustrates the female fitting member Bf in order to illustrate the positional relationship at the time of fitting.

As illustrated in FIG. 9, an insulating portion 32 may be provided not only in the female fitting member Bf but also in the male fitting member Bm. Similarly to the insulating portion 31, the insulating portion 32 is realized by, for example, a layer of an insulator or an insulating film. The insulator of the insulating portion 32 is, for example, the same as the insulator of the insulating portion 31, but may be different. The insulating portion 32 provided at the tip portion 13 is realized by, for example, glossy coating.

The insulating portion 32 of the male fitting member Bm is provided in a region of the male fitting member Bm that is not in contact with each other when the male fitting member Bm and the female fitting member Bf are normally fitted. As an example, as illustrated in FIG. 9, the insulating portion 32 is provided in a region of the male fitting member Bm that is not in contact with a region of the first bent portion 23*a* of the female fitting member Bf bulging in a protruding shape at the time of fitting. On the other hand, a conductive portion 12 is provided in a region that comes into contact with a region of the first bent portion 23*a* of the female fitting member Bf bulging in a protruding shape at the time of fitting.

For example, the conductive portion 12 and the insulating portion 32 are realized by forming the male fitting member Bm by an insulator, providing the insulating portion 32 on the entire male fitting member Bm formed by a conductor, and applying conductor plating only on a region in contact with the female fitting member Bf in the fitted state. Alternatively, the conductive portion 12 and the insulating portion 32 are realized by forming the male fitting member Bm by a conductor, providing conductor plating on the entire male fitting member Bm formed by an insulator, and providing the insulating portion 32 only on a region not in contact with the female fitting member Bf in the fitted state.

As described above, in the inter-component connection structure according to the present modification, the insulating portion 32 is provided in a region of the male fitting member Bm that is not in contact with the female fitting member Bf at the time of fitting. Even with this configuration, the same effects as those of the above-described embodiment and each modification can be obtained. In addition, since the insertion depth of the insertion portion 11 at the time of fitting is defined by the position of the conductive portion 12, it is possible to suppress an inappropriate fitting state such as half-fitting.

Note that the male fitting member Bm and the female fitting member Bf according to the above-described embodiment and each modification can be arbitrarily combined. For example, the female fitting member Bf according to the first modification or the second modification and the male fitting member Bm according to the third modification can be used as the pair of fitting members B.

As described above, according to the inter-component connection structure, the power conversion device 1, and the inter-component connection method according to the present disclosure, it is possible to suppress electrical connection failure in the fitting portion that electrically connects the components.

According to the inter-component connection structure, the power conversion device, and the inter-component connection method according to the present disclosure, it is possible to suppress electrical connection failure in the fitting portion that electrically connects the components.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An inter-component connection structure comprising:
a male fitting member that has an insertion portion; and
a female fitting member that has a first nipping portion and a second nipping portion disposed to face each other, and nips the insertion portion of the male fitting member inserted between the first nipping portion and the second nipping portion, wherein
the male fitting member and the female fitting member are disposed in/on different components,
the first nipping portion and the second nipping portion are respectively bent to form protruding portions which protrude toward each other,
a first gap is provided at a tip portion of each of the first nipping portion and the second nipping portion,
in at least one of the male fitting member and the female fitting member, an insulating portion is provided in a first region that is not in contact with the other when fitted and a conductive portion is provided in a second region that is in contact with the other when fitted,
the insulating portion provided in the first region is formed of an insulator having a heat dissipation property,
the insulating portion is provided at a first tip of the insertion portion and is subjected to first surface treatment,
the male fitting member further has a first connection portion and a second connection portion divided by a second gap,
the first connection portion and the second connection portion are bent in a direction substantially perpendicular to the insertion portion,
an end of the first connection portion and an end of the second connection portion extend substantially perpendicular to the insertion portion, and
the first connection portion is bent in a direction opposite to the second connection portion with respect to the insertion portion.

2. The inter-component connection structure according to claim 1, wherein the first surface treatment is at least one of surface treatment for reducing frictional resistance between the male fitting member and the female fitting member, and surface treatment for increasing wear resistance.

3. The inter-component connection structure according to claim 1, wherein an end surface of a second tip of the female fitting member, into which the insertion portion is inserted, is subjected to end surface treatment for removing an edge of the end surface.

4. The inter-component connection structure according to claim 1, wherein each of the first nipping portion and the second nipping portion is subjected to end surface treatment, at a second tip into which the insertion portion is inserted, to be bent outward and away from each other.

5. The inter-component connection structure according to claim 1, wherein the at least one of the male fitting member and the female fitting member is in contact with the other at the protruding portion, and the conductive portion is provided in the protruding portion.

6. The inter-component connection structure according to claim 1, wherein the insulating portion is an insulator layer formed on a surface of the female fitting member.

7. The inter-component connection structure according to claim 1, wherein the conductive portion is a conductive layer formed on a surface of the female fitting member.

8. The inter-component connection structure according to claim 1, wherein the insulating portion is formed by glossy coating.

9. The inter-component connection structure according to claim 1, wherein the first connection portion and the second connection portion are soldered to predetermined positions on a board, and electrically connect the insertion portion to a wiring on the board.

10. The inter-component connection structure according to claim 1, wherein the first nipping portion and the second nipping portion are separated more from each other toward a second tip into which the insertion portion is inserted, and the insulating portion is provided at the second tip and is subjected to second surface treatment.

11. The inter-component connection structure according to claim 10, wherein the second surface treatment is at least one of surface treatment for reducing frictional resistance between the male fitting member and the female fitting member, and surface treatment for increasing wear resistance.

* * * * *